United States Patent [19]

Krüger

[11] Patent Number: 4,518,315
[45] Date of Patent: May 21, 1985

[54] ARRANGEMENT FOR CONNECTING A CERAMIC ROTOR WHEEL, PARTICULARLY A TURBINE ROTOR WHEEL OF A TURBOMACHINE, SUCH AS A GAS TURBINE ENGINE, TO A METALLIC SHAFT

[75] Inventor: Wolfgang Krüger, Reichertshausen, Fed. Rep. of Germany

[73] Assignee: Motoren- und Turbinen-Union Munchen GmbH, Fed. Rep. of Germany

[21] Appl. No.: 400,061

[22] Filed: Jul. 20, 1982

[30] Foreign Application Priority Data

Jul. 24, 1981 [DE] Fed. Rep. of Germany ....... 3129220

[51] Int. Cl.³ .......................... F01D 5/28; F01D 5/30
[52] U.S. Cl. ........................... 416/241 B; 416/244 A; 403/273
[58] Field of Search ........... 416/241 B, 244 A, 244 R; 415/214; 403/273

[56] References Cited

U.S. PATENT DOCUMENTS

| 3,524,665 | 8/1970 | Hohn et al. | 403/273 |
|---|---|---|---|
| 3,642,383 | 2/1972 | Andvig | 416/244 A |
| 3,943,703 | 3/1976 | Kronogard | 416/244 A X |
| 4,011,737 | 3/1977 | Kruger et al. | 416/241 B X |
| 4,123,199 | 10/1978 | Shimizu et al. | 416/244 A X |
| 4,176,519 | 12/1979 | Kronogard | 416/244 A X |
| 4,207,029 | 6/1980 | Ivanko | 416/241 B |
| 4,272,954 | 6/1981 | Kronogard | 416/241 B X |
| 4,349,291 | 9/1982 | Geary, Jr. | 416/244 A X |
| 4,362,471 | 12/1982 | Langer et al. | 416/244 A |

FOREIGN PATENT DOCUMENTS

| 427135 | 2/1923 | Fed. Rep. of Germany ... 416/244 A |
| 2728823 | 1/1979 | Fed. Rep. of Germany . |
| 2734747 | 2/1979 | Fed. Rep. of Germany . |
| 1366169 | 9/1974 | United Kingdom . |

Primary Examiner—Robert E. Garrett
Assistant Examiner—Joseph M. Pitko
Attorney, Agent, or Firm—Scully, Scott, Murphy & Presser

[57] ABSTRACT

An arrangement for connecting a ceramic rotor wheel, particularly a turbine rotor wheel of a turbomachine, such as a gas turbine, to a metallic shaft. In order to obtain a primarily temperature-resistant (ceramic wheel-to-metal shaft) connection suitable for high speeds, the arrangement includes a thermal insulation ring seated on the shaft journal of a ceramic rotor wheel, on which there is mounted the tubular end portion of the metallic machine shaft, and which is then positioned on the shaft journal for positive connection through the intermediary of at least one fiber ring which is press-fitted onto the end portion of the shaft.

10 Claims, 4 Drawing Figures

ARRANGEMENT FOR CONNECTING A CERAMIC ROTOR WHEEL, PARTICULARLY A TURBINE ROTOR WHEEL OF A TURBOMACHINE, SUCH AS A GAS TURBINE ENGINE, TO A METALLIC SHAFT

BACKGROUND OF THE INVENTION

1. Field of the Invention

The present invention relates to an arrangement for connecting a ceramic rotor wheel, particularly the turbine rotor wheel of a turbomachine, such as a gas turbine engine, to a metallic shaft, in which the connection is formed between a shaft journal of the ceramic rotor wheel and a tubular end portion of the metallic machine shaft which is mounted thereon.

2. Discussion of the Prior Art

In presently proposed or currently known arrangements of the above-mentioned type, relatively considerable difficulties are still encountered in the design of a suitable, positive interconnection between the respective metallic machine shaft and a ceramic rotor wheel, particularly a turbine rotor wheel.

Consequently, for this purpose, there have been proposed shrink-fitted connections, adhesive connections, or even soldered connection. However, on the other hand, because of the extremely different material properties and structures of ceramic components, and on the other hand, those of the metallic components, and because of the widely differing coefficients of thermal expansion involved in these connections and the stresses in the materials resulting therefrom, it has heretofore not been possible to obtain a satisfactory result for such connections (metal-ceramic).

In addition thereto, connections of that type must be able to safely sustain the high speeds and temperatures associated with modern gas turbine engines in which, among other factors, there must be considered the centrifugal loads and stresses caused by the relatively high rotational speeds, particularly in the outer peripheral region of this connection.

SUMMARY OF THE INVENTION

Accordingly, it is a basic object of the present invention to provide an arrangement of the type described which will ensure a durable, positive interconnection between a metallic machine shaft and a ceramic rotor wheel in a turbomachine at relatively high temperatures and prevailing rotational speeds.

It is a more specific object of the present invention to provide an arrangement as described, which provides for a thermal insulation ring which is attached on the shaft journal of the ceramic rotor wheel, on which there is mounted the tubular end portion of the metallic machine shaft and, thereafter, is positively fastenable on the shaft journal through the intermediary of at least one fiber ring which is press-fitted onto the end portion of the shaft.

The advantages which are obtained through the present invention in comparison with a shrink-fitted connection are as follows:

(a) The coefficient of thermal expansion of the fiber ring (about $1 \times 10^{-6} K^{-1}$) is lower than that of the ceramic turbine wheel (about 2 to $4.5 \times 10^{-6} K^{-1}$). In contrast with a shrink-fitted connection, any loosening of the inventive connection, which could be caused by thermal expansions, is not possible.

(b) The fiber (CFC) ring evidences a lower specific weight ($\gamma = 1.7$ to $1.8$) than the metallic shaft in a shrink-fitted connection. This produces a substantially reduced expansion dependent upon the rotational speeds.

(c) The fiber ring pursuant to the present invention is in a position to extensively absorb the expected relatively high tangential stresses.

(d) Proceeding from the premise that the fiber ring is externally coated with a special metal having a lower coefficient of thermal expansion, there can be employed a service temperature of about 800° C., whereas in the case of an uncoated construction the service temperature can be about 500° C. In the case of an uncoated embodiment of the fiber ring, the usable service temperature would be generally in the range of that for a shrink-fitted connection, which is considered in the range of about 400° to 500° C.

BRIEF DESCRIPTION OF THE DRAWINGS

Reference may now be had to the following detailed description of the invention, taken in conjunction with the accompanying drawings; in which.

DETAILED DESCRIPTION

Figure 1:
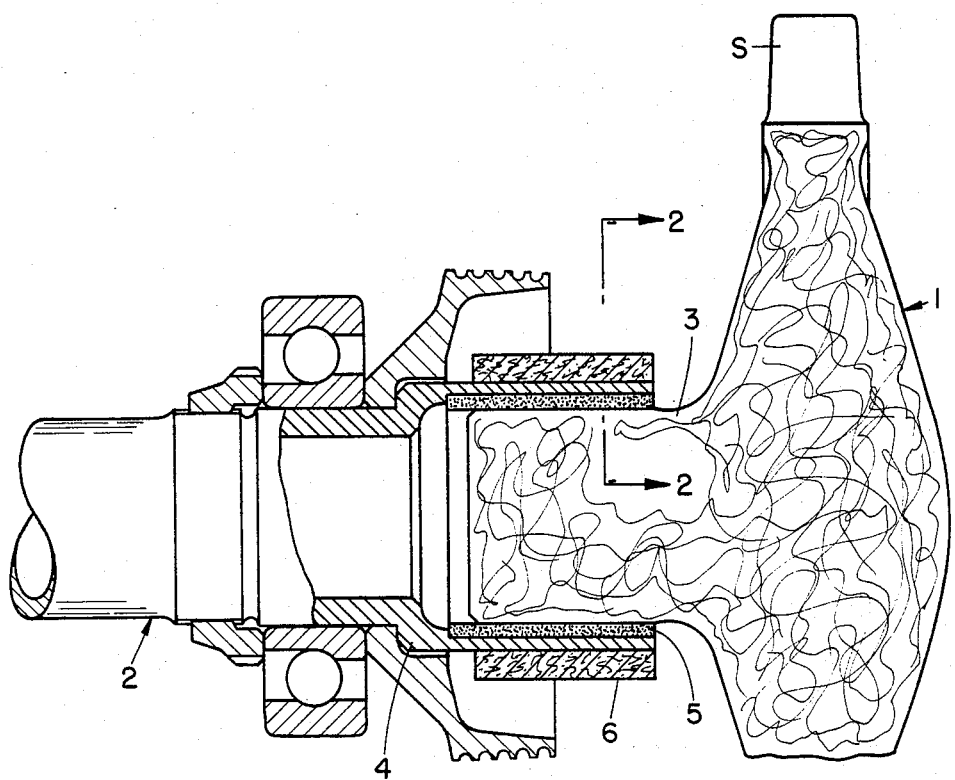
FIG. 1 is a partially sectioned elevational view of one embodiment of the invention showing the interconnection of a tubular, metallic machine shaft end with the shaft journal of a ceramic wheel.

FIG. 1 illustrates the connection between a ceramic turbine rotor wheel 1 of a gas turbine engine and a metallic machine shaft 2.

In accordance with FIG. 1, the invention, among other aspects, provides for a thermal insulation ring 5 which is seated on the shaft journal 3 of the ceramic rotor wheel 1. Mounted on this thermal insulation ring 5 is a tubular end portion 4 of the metallic machine shaft 2, and then mounted for positive connection on the shaft journal through the intermediary of at least one fiber ring 6 which is press-fitted on the end portion 4. As can be more particularly ascertained from FIGS. 2, 3 and 4, the respective tubular end portions 4, 4' and 4" can be constructed lighter in material in the overlapping area of the end portion-shaft journal connection.

In essence, the fiber ring 6 is pressed-on or shrink-fitted onto the tubular end portion 4 of the metallic machine shaft 2, preferably in the axial direction. During the pressing on or shrink-fitting of the fiber ring, the relatively thin-walled shaft end portion 4 is compressed together in a rotationally-symmetrical manner so as to provide a press fitted seat with the thermal insulation ring 5. In turn, the insulation ring is then pressed onto the shaft journal 3 of the ceramic rotor wheel 1. Thus, the fiber ring 6 provides for the entire positive interconnection between the components 3, 4 and 5.

The further function of the fiber ring 6 consists of that deformation forces reigning at the interconnection, which are produced by centrifugal forces during operation, are taken up in the outer circumferential region and are uniformly dissipated so that, notwithstanding extreme differences in rotational speeds, no loosening of the entire connection need be expected.

Figure 2:
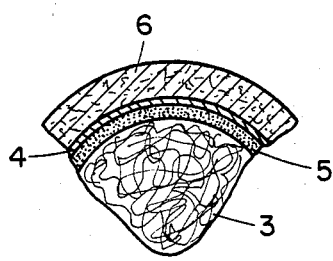
FIG. 2 is a sectional view taken along line II—II in FIG. 1 and illustrates a rotationally symmetrical lighter-constructed machine shaft end at the point of connection.

FIGS. 1 and 2 embody, in accordance therewith, an end portion 4 of tubular design which is constructed rotationally-symmetrically lighter through a uniform reduction in the wall thickness of a thin-walled sleeve end.

Figure 3:
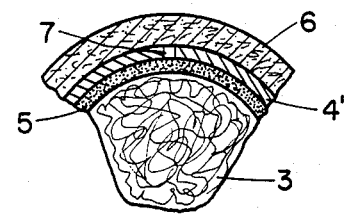
FIGS. 3 and 4 are each views, taken along line II—II in FIG. 1, of different embodiments which illustrates local, selectively lighter-constructed sleeve-like shaft ends of the respective machine shaft.
Figure 4:
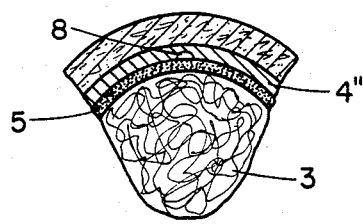

FIGS. 3 and 4 illustrate exemplary embodiments of locally, material-lightened tubular end portions 4', 4''; wherein FIG. 3 shows the local lightening being attained through axial slots 7, whereas in FIG. 4 this is achieved by means of axially extending grooves 8, with these grooves advantageously opening at the side on which they contact the respective thermal insulation ring 5.

The ceramic rotor wheel, including the shaft journal, can be advantageously constituted of silicon nitride or silicon carbide.

Moreover, the currently utilized thermal insulation ring can be constituted of aluminum titanate or of pyrolitic boron nitride.

A further important aspect of the inventive concept can also be ascertained in the production of the at least one fiber ring from carbon fibers which are embedded in a carbon matrix (CFC).

On the other hand, the invention does not preclude the manufacture of the at least one fiber ring from fiber-reinforced plastic, conceivably through the utilization of carbon fibers.

In the interest of relatively high resistance to temperature, in accordance with the present invention, the fiber ring should be provided with an external coating of a special ceramic material having a low coefficient at thermal expansion. For example, CFC fiber ring can be coated with silicon carbide (SiC).

The coating can be deposited onto the fiber ring by a chemical vapor deposition process (CVD process).

While there has been shown and described what are considered to be preferred embodiments of the invention, it should be understood that variations in form and detail could readily be made without departing from the spirit of the invention. It is therefore intended that the invention be not limited to the exact form and detail shown herein and described, nor to anything other than the whole of the invention as hereinafter claimed.

What is claimed is:

1. In an arrangement for interconnecting a ceramic rotor wheel, particularly a turbine rotor wheel of a turbomachine, such as a gas turbine engine, with a metallic shaft, said connection being formed between the shaft journal of the ceramic rotor wheel and a tubular end portion of the metallic machine shaft assembled therewith, the improvement comprising a ring constituted of a thermally insulating material being seated on the shaft journal of the ceramic rotor wheel on which there is positioned the tubular end portion of the metallic machine shaft so as to extend intermediate said tubular end portion of the machine shaft and the shaft journal of the rotor wheel; and at least one fiber ring having a coefficient of thermal expansion lower than that of the shaft journal of the ceramic rotor wheel to form a positive connection of the shaft end portion on the shaft journal, said fiber ring being press-fitted onto the end portion of the shaft and exerting a radial compressive force against the facing surfaces of said end portion of the shaft, said ring of thermally insulating material and said shaft journal to provide a rotationally symmetrical formfitted connection between the facing surfaces of said components.

2. Arrangement as claimed in claim 1, wherein the tubular end portion of said shaft has a lighter construction in at least the overlapping region of the shaft journal and end portion connection.

3. Arrangement as claimed in claim 2, wherein said tubular shaft end portion is of a rotationally-symmetrically lightened construction formed by a reduced wall thickness.

4. Arrangement as claimed in claim 2, wherein said tubular shaft end portion is of a locally, selectively lightened structure formed by axially extending slots.

5. Arrangement as claimed in claim 2, wherein said tubular shaft end portion is of a locally, selectively lightened structure formed by grooves in the end portion opening towards the contacting thermal insulation ring.

6. Arrangement as claimed in claim 1, wherein the ceramic rotor wheel and the shaft journal selected from the group consisting of silicon nitride and silicon carbide.

7. Arrangement as claimed in claim 1, wherein the thermal insulation ring comprising material selected from the group consisting of aluminum titanate and pyrolitic boron nitride.

8. Arrangement as claimed in claim 1, herein said at least one fiber ring consists of carbon fibers imbedded in a carbon matrix.

9. Arrangement as claimed in claim 1, wherein said at least one fiber ring comprises a carbon fiber-reinforced plastic material.

10. Arrangement as claimed in claim 8 or 9, wherein said at least one fiber ring has an external high temperature-resistant ceramic coating with a low coefficient of thermal expansion, such as silicon carbide.

* * * * *